US012632032B2

(12) United States Patent
Hasler et al.

(10) Patent No.: US 12,632,032 B2
(45) Date of Patent: May 19, 2026

(54) METHOD FOR PLANNING ACTIONS BASED ON AN ELEMENTARY ATTRIBUTE SPACE

(71) Applicant: Honda Motor Co., Ltd., Tokyo (JP)

(72) Inventors: Stephan Hasler, Offenbach (DE);
Daniel Tanneberg, Offenbach (DE);
Michael Gienger, Offenbach (DE)

(73) Assignee: Honda Motor Co., Ltd., Tokyo (JP)

( * ) Notice: Subject to any disclaimer, the term of this patent is extended or adjusted under 35 U.S.C. 154(b) by 541 days.

(21) Appl. No.: 18/192,623

(22) Filed: Mar. 29, 2023

(65) Prior Publication Data

US 2024/0295867 A1 Sep. 5, 2024

Related U.S. Application Data

(60) Provisional application No. 63/449,056, filed on Mar. 1, 2023.

(51) Int. Cl.
*G05B 19/409* (2006.01)

(52) U.S. Cl.
CPC .. *G05B 19/409* (2013.01); *G05B 2219/40414* (2013.01)

(58) Field of Classification Search
USPC ........................................................ 700/83
See application file for complete search history.

(56) References Cited

U.S. PATENT DOCUMENTS 10,474,961 B2 11/2019 Brigham et al.
11,014,235 B2 5/2021 Sarkar et al.

2016/0171099 A1 6/2016 Lorge et al.
2019/0361439 A1* 11/2019 Zeng ........................ G06V 20/56
2019/0361456 A1* 11/2019 Zeng ........................ G01C 21/20
2020/0012670 A1* 1/2020 Heckmann ................ G06N 5/02
2020/0363800 A1* 11/2020 Jojo-Verge ......... B60W 60/0011
2022/0374723 A1* 11/2022 Blukis ................... G06F 18/217
(Continued)

FOREIGN PATENT DOCUMENTS

EP 3178617 A2 * 6/2017 ........... B25J 9/1615
EP 3591521 B1 * 7/2023 ............. G06F 9/453

OTHER PUBLICATIONS

Michael et al. "Goal Modeling and MDSE for Behavior Assistance", IEEE, 2021, p. 370-379. (Year: 2021).*
(Continued)

*Primary Examiner* — Hien D Khuu
(74) *Attorney, Agent, or Firm* — JCIPRNET

(57) ABSTRACT

A method for operating an assistance system based on an attribute space obtains task information defining a target state and initial state information of an autonomous device or a user, and of an object. A planning problem is defined based on the task information, the initial state information, and further based on attribute information related to the object. The method selects an action to solve the planning problem. A control signal to a human-machine interface HMI or the autonomous device for achieving the target state is generated and output. The method decomposes, in case of determining that the selected action does not achieve the target state, the planning problem based on the attribute information to generate a decomposed planning problem, solve the decomposed planning problem, and generates the control signal based on the solved decomposed planning problem.

17 Claims, 7 Drawing Sheets

(56) References Cited

U.S. PATENT DOCUMENTS

| 2024/0184291 A1* | 6/2024 | Hermans | ............. | G05D 1/0212 |
| 2024/0300096 A1* | 9/2024 | Cherian | .................. | B25J 9/161 |

OTHER PUBLICATIONS

WO_2022235973_A1 (Year: 2022).*

Meiying Qin et al., "Rapidly Learning Generalizable and Robot-Agnostic Tool-Use Skills for a Wide Range of Tasks," Frontiers in Robotics and AI, vol. 8, Article 726463, Dec. 14, 2021, pp. 1-22.

Tesca Fitzgerald et al., "Modeling and Learning Constraints for Creative Tool Use," Frontiers in Robotics and AI, vol. 8, Article 674292, Nov. 5, 2021, pp. 1-19.

Ashley Tews et al., "Thinking as One: Coordination of Multiple Mobile Robots by Shared Representations," Proceedings. 2000 IEEE/RSJ International Conference on Intelligent Robots and Systems (IROS 2000) (Cat. No.00CH37113), Oct. 2000-Nov. 5, 2000, pp. 1-6.

Corey Goldfeder et al., "Grasp Planning via Decomposition Trees," Proceedings 2007 IEEE International Conference on Robotics and Automation, Apr. 10-14, 2007, pp. 1-6.

Moritz Tenorth et al., "A unified representation for reasoning about robot actions, processes, and their effects on objects," 2012 IEEE/RSJ International Conference on Intelligent Robots and Systems, Oct. 7-12, 2012, pp. 1-8.

Leslie Pack Kaelbling et al., "Hierarchical task and motion planning in the now," 2011 IEEE International Conference on Robotics and Automation, May 9-13, 2011, pp. 1-8.

* cited by examiner

COMPUND ATTRIBUTE SPACE

ELEMENTARY ATTRIBUTE SPACE

DEVICES

MEANS

FIG. 5

MEANS           OBECTS           ELEMENTARY ATTRIBUTE SPACE

FIG. 6

METHOD FOR PLANNING ACTIONS BASED ON AN ELEMENTARY ATTRIBUTE SPACE

CROSS-REFERENCE TO RELATED APPLICATION

This application claims the priority benefit of U.S. application Ser. No. 63/449,056, filed on Mar. 1, 2023. The entirety of the above-mentioned patent applications are hereby incorporated by reference herein and made a part of this specification.

TECHNICAL FIELD

The disclosure concerns the general field of robotics and assistance systems. In particular, a method that improves a planning process for actions for operating an assistance system and a corresponding computer program is proposed.

BACKGROUND

The environment of an assistance system or a robotic system can be represented by a set of attributes. The term attribute denotes a variable that can take different values. Assigning an actual value to each attribute defines a certain state of the environment. In general, the task of the robotic system can be formulated as to reach a given goal by performing an action, or a sequence of actions, for reaching a target state of the environment starting from an initial state. Correspondingly, the task of the assistance system can be formulated as to guide the robotic system or, via human-machine interface, a human user, to achieve the given target state of the environment starting from the initial state. The assistance system commands a set of actions that define what needs to be done in order to change from one state (initial state) to one or several next states (target state or target states). The domain knowledge of the assistance systems includes the attributes and actions available to the assistance system's domain.

In a planning process, the assistance system selects and potentially combines actions in a certain order to reach a desired target state according to a problem description. A planning problem defines the problem description and provides the input to the planning process.

The assistance system uses attributes for representing the states of the environment. Regarding the example of an assistance system that operates a kitchen robot as an example of an autonomous device, the kitchen robot may have the action or skill to move in the kitchen environment to reach a certain location. The kitchen robot may have the skills to move an arm and an end-effector arranged at an end of the arm, e.g. a hand, and to interact with objects, e.g. a bread, and with devices, e.g. a knife or a toaster, in the kitchen environment. Accordingly, the assistance system operating the kitchen robot has detailed attributes that describe which devices are in the kitchen, at what location each device currently is, and which parts of each device, e.g. which switches, handles, and levers of each device may be manipulated and which openings or doors provide access to an interior of devices, e.g. a cupboard, for example. This allows the assistance system to use a planning module in order to find a plan for the kitchen robot how to reach and how to operate each device that is a composition of the modelled parts or skills. This applies even in case the robot has never experienced some of the devices in action before.

Nevertheless, using the attributes as abstractions results in losing degrees of detailed information.

For example, many aspects are usually simplified and condensed in the attribute space. The kitchen robot might be given attributes that represent that a certain device was applied on a particular object, e.g., "was_in_toaster bread_1", "was_in_egg_cooker egg_1", "was_in_pan meat_3". Attributes may define what was the holistic effect of an action, e.g. "toasted bread_1", "cooked egg_2", "cooked meat_3". Such attributes are compound attributes, which abstract on a high level which of the more elementary physical properties of the object changed. In the example of the kitchen environment, the compound attribute "toasted bread" represents an abstraction for a combination of the elementary attributes "[hot, brown, crispy]". Using compound attributes, the assistance system may plan in an efficient manner how to prepare a recipe only by sticking to a learned order of known types of devices.

However, using compound attributes in particular may result in restrictions.

State-of-the-art planning problems are usually defined in a narrow and problem-specific domain, e.g. the kitchen robot operating in the kitchen environment with food and kitchen tools. Expert users define the state and action spaces explicitly designed for particular problems. Thus, planning problems are applicable to the narrow and specific domains, in which current planners achieve impressive results. Nevertheless, the narrow approach currently pursued reaches its limitations when considering wider problem-solving capabilities that exceed a pre-defined problem domain.

The focus in existing assistance systems and planning modules emphasizes restricted services in small, closed, and well-defined domains. However, extending the capabilities of the assistance system to treat a whole kitchen environment, an entire house or even the world as a single domain would offer an enlarged set of services and application areas. Moreover, planning problems or problems during plan execution, for example arising from unavailability of required devices, e.g. missing the toaster, are also problematic in the current specific and confined domain definitions.

It is desirable overcome the limitations of the narrow and specialized domains of the available robotic assistance systems.

SUMMARY

The method for operating an assistance system based on an attribute space according to the first aspect and the computer program according to the second aspect address the issues.

The dependent claims define further advantageous embodiments.

The method for operating an assistance system based on an attribute space according to the first aspect comprises obtaining task information, defining at least one target state to be achieved by the assistance system, and obtaining initial state information defining an initial state of at least one of an autonomous device or an assisted person, and of at least one object involved in achieving the target state or one of the target states in case a plurality of target states is defined. It is to be noted that hereinafter in order to improve readability of the disclosure, it is always referred to "the target state" which is the only target state in case only one target state is defined or one of the plurality of target states, in case that a plurality of target states are defined. The method proceeds with defining a planning problem based on the obtained task information, the initial state information and further based on attribute information related to the at least one object stored in a database. Then, a planning module selects an action or a sequence of actions to solve the generated planning problem. The method subsequently generates and outputs a control signal to at least one of a human machine interface for assisting the user in achieving the target state or to the autonomous device for achieving the target state. The method further determines, whether the selected action or sequence of actions achieves the target state. In case of determining that the selected action or sequence of actions does not achieve the target state, the method proceeds with decomposing the generated planning problem based on the attribute information stored in the database to generate a decomposed planning problem, and providing the decomposed planning problem to the planning module. The planning module solves the decomposed planning problem. The method then generates and outputs the control signal based on the solved decomposed planning problem to at least one of the human-machine interface for assisting the user in achieving the at least one target state or to the autonomous device for achieving the at least one target state.

A computer program product according to the second aspect comprises a non-transitory computer readable medium having the computer readable program embodied therein, wherein the computer readable program, when executed on a computing device, causes the computing device to perform a method for operating an assistance system based on an attribute space, the method comprising: obtaining task information defining a least one target state to be achieved by the assistance system, obtaining initial state information defining an initial state of at least one of an autonomous device or an assisted person, and of at least one object involved in achieving the target state (one of the target states in case of a plurality of defined target states). The method defines a planning problem based on the obtained task information, the initial state information and further based on attribute information related to the at least one object stored in a database and includes selecting, by a planning module, an action or a sequence of actions to solve the generated planning problem. The method includes generating and outputting a control signal to at least one of a human machine interface HMI for assisting the user in achieving the target state or to the autonomous device for achieving this target state. The method further comprises: determining, whether the selected action or sequence of actions achieves the target state (one of the target states), and, in case of determining that the selected action or sequence of actions does not achieve the respective target state, decomposing the generated planning problem based on the attribute information stored in the database to generate a decomposed planning problem, and providing the decomposed planning problem to the planning module. The method proceeds with solving, by the planning module, the decomposed planning problem; and generates and outputs the control signal based on the solved decomposed planning problem to at least one of the human-machine interface for assisting the user in achieving the target state or to the autonomous device for achieving the target state.

BRIEF DESCRIPTION OF THE DRAWINGS

The description of embodiments refers to the enclosed figures, in which

FIG. 5 provides an exemplary data structure of attribute information illustrating a correspondence between objects, means for achieving effects and effects on objects;

FIG. 6 provides an exemplary data structure of attribute information illustrating a correspondence between means for achieving effects, objects, and representation of means in the elementary attribute space.

In the figures, corresponding elements in different figures have same reference signs. The description of the figures dispenses with describing same reference signs in different figures wherever deemed possible without adversely affecting comprehensibility.

DETAILED DESCRIPTION

Figure 1:
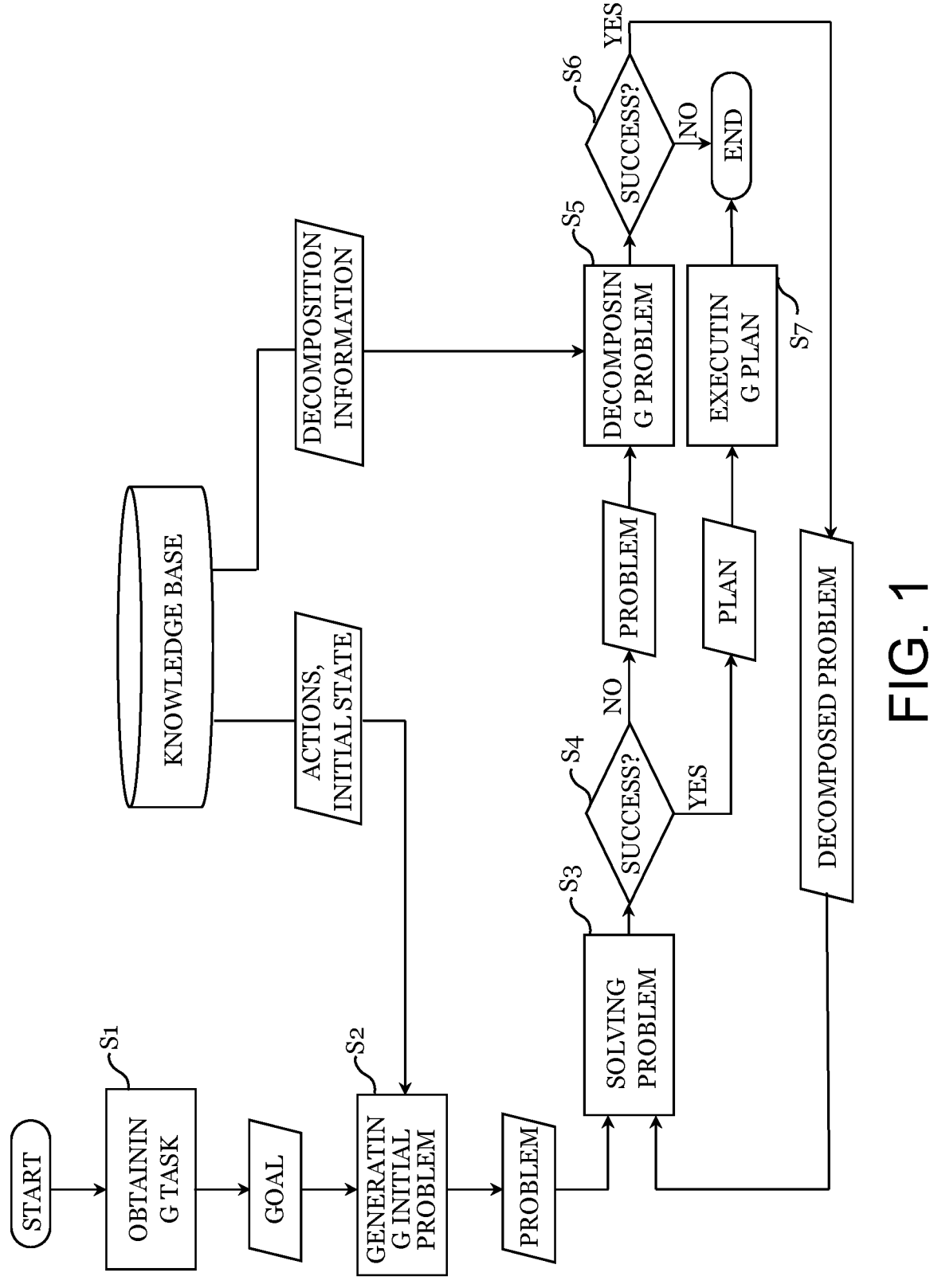
FIG. 1 is a schematic view of the general planning loop of the method according to an embodiment.

The proposed iterative planning system first tries to solve the original planning problem that will usually contain compound attributes. The proposed method makes innovative use of underlying similarities of the objects, devices, and effects in the environment of the assistance system in case the planner cannot solve the original planning problem.

Solving the original planning problem may fail when a preferred device is missing. Given this case, the planning module will decompose the planning problem into a decomposed or elementary planning problem in a more general, physical attribute space, called decomposed attribute space or, sometimes, elementary attribute space. In the decomposed attribute space, instead of representing actions and effects in the rather abstract compound attribute space for the expected tasks in each specific domain, the decomposing process breaks compound attributes down to a single, more universal sets of low-level, grounded attributes that capture the underlying physical processes in more detail than the compound attributes are able to do. The shared fundamental representation in the elementary attribute space facilitates a transfer between different tasks and different environments by treating the world as a single domain. The decomposing step increases a solution space of a given problem, which improves the possibility to solve the problem.

Some elementary attributes may be measurable for the assistance system, contrary to the compound attributes. Thus, the assistance system may even infer new actions that base on an observation of the task environment and independently explore the task environment.

Regarding the example of the assistance system in a kitchen environment, the assistance system originally using compound attributes is able to plan preparation of a given recipe only by sticking to a learned order of applying known types of devices. Generally, using the compound attributes causes limitations, which the proposed method for operating the assistance system including the attribute-decomposing step overcomes:

Known assistance systems cannot plan to replace a commonly used device, as such systems miss information how different compound attributes relate to each other. This may concern compound attributes such as "was_in_toaster" and "was_in_egg_cooker", as known assistance system miss any rationale how "toasted" relates to "cooked". The elementary attributes introduce relations between different actions and states, which the compound attributes do not describe due to their high level of abstraction compared to the elementary attributes.

A compound attribute might have different meanings, which respectively apply under different circumstances or conditions, which in turn may lead to wrong plans to solve a planning problem defined in the compound attribute space. This may e.g. apply to "being cooked", which might have different meanings for different objects, e.g., an "egg" and "meat", an "egg cooker" and a "pan".

The assistance system cannot measure compound attributes. This hinders the assistance system in accessing the current state of the environment. The current state of the environment generally denoted the initial state, needs to be known before planning and potentially also during executing a found plan in order to verify a success of an action. In the example of the assistance system for the kitchen environment, it is helpful to find out whether the egg is cooked already but this requires a measurable concept of what it means for an egg to be cooked. In a further example, the assistance system requires determining whether the toaster is not working properly, which requires a measurable concept of what it means to be toasted.

Decomposing the compound attributes into elementary attributes overcomes the current limit of detail in which a user can express a desire or a feedback, e.g. a preference for the toast being more or less toasted in the compound attribute space compared to a preference for the toast being more crispy but less hot in the elementary attribute space.

In the method for operating an assistance system according to an embodiment, the stored attribute information comprises compound attributes and elementary attributes defining at least a state of the at least one object, an initial state of the planning problem, and an effect a device has on the at least one object under at least one predetermined condition.

According to an embodiment of the method for operating an assistance system, decomposing the generated planning problem includes mapping at least one compound attribute included in the generated planning problem to a set of elementary attributes based on the stored attribute information.

The stored attribute information may, in an embodiment of the method comprise a correspondence table that stores compound attributes associated with sets of elementary attributes for performing the mapping.

The correspondence table may be a pre-stored lookup table.

According to an embodiment of the method for operating an assistance system, the mapping includes at least one of mapping the at least one target state g, the initial state $s_i$, and the planning domain $\Sigma$ in a compound attribute space to at least one respective elementary target state g', an elementary initial state $s_i$', and an elementary planning domain $\Sigma'$ in an elementary attribute space.

The method for operating an assistance system according to an embodiment comprises predicting a new mapping of the compound attribute to the set of elementary attributes based on a similarity of the new mapping to a predetermined mapping in terms of a similarity of the at least one object with another object.

According to an embodiment, this prediction includes predicting that the at least one object exerts a similar effect as the other object in case the at least one object and the other object expose an object to a same means.

The expression "means" refers to a physical process. The device exposes an object to the physical process, which finally results in a particular effect on the object.

The method for operating an assistance system according to an embodiment comprises predicting a new mapping of the compound attribute to the set of elementary attributes based on the similarity, wherein the prediction of the new mapping includes generalizing a prediction that a predetermined object exerts an effect to an object category. Predicting the new mapping includes predicting that another predetermined object of the same object category exposes an object to the same means and provides the same effect as the predetermined object.

According to an embodiment of the method for operating an assistance system, predicting a new mapping of the compound attribute to the set of elementary attribute is based on at least one of a predetermined relation information provided during a design phase of the assistance system, a relation information generated by an expert, and relation information generated online in an interaction process with a user of the assistance system.

The method for operating an assistance system according to any one of the preceding claims may comprise decomposing the generated planning problem based on the stored attribute information iteratively to generate the decomposed planning problem until a predetermined criterion is met.

Decomposing iteratively means the method repeatedly executes the step of decomposing the generated planning problem until the predetermined criterion is met.

According to an embodiment of the method for operating an assistance system, the method determines that the predetermined criterion is met in case the selected action or sequence of actions solving the decomposed planning problem achieve the at least one target state.

The method may determine that the predetermined criterion is met in case no further mapping of the compound attribute to a corresponding set of elementary attributes based on the stored attribute information is available.

According to an embodiment of the method, the method runs online during a planning process for achieving the at least one target state.

The assistance system may be included in a robotic assistance system that includes the autonomous device.

The assistance system may be implemented in a controller of the autonomous device.

The assistance system may be implemented in software running on a remote server linked via a network to the autonomous device.

According to an embodiment of the method for operating an assistance system, the assistance system guides the user via the human-machine interface in achieving the target state. The human-machine interface may include a virtual reality device configured to visualize a task environment existing in the real world to the user. Additionally or alternatively, the human-machine interface may include an augmented reality device configured to present information for guiding the user as an overlay to the task environment existing in the real world to the user and as perceived by the user. Additionally or alternatively, the human-machine interface may include the virtual reality device configured to visualize a generated virtual environment to the user.

The computer program with program code means according to the second aspect is configured to, when the program is executed on computer or signal processor, cause the computer or signal processor to perform the method according to any of the embodiments of the method for operating the assistance system.

The proposed methods and systems concern planning tools for planning actions, in particular in the field of operating autonomous devices, e.g. in the field of robotics, and assisting users in addressing given tasks and in achieving set goals. The terminology employed in the following description of embodiments originates from these application fields and includes in particular:

The term attribute denotes a named variable that can take different values.

The value can be categorical, e.g., a Boolean value, or may be a continuous value.

A compound attribute is a single attribute that is a placeholder or an abstraction of a set of more specific attributes. A compound attribute may e.g. represent properties of an object.

An elementary attribute is a more physical attribute compared to the compound attribute. The elementary attribute alone stands for a concrete, often measurable property of an object. Elementary attributes regularly show a strong independence with respect to other elementary attributes, as decomposing elementary attributes into shared parts is impossible.

The attribute space refers to a set of attributes that a system uses to model its environment.

A compound attribute space is an attribute space that contains some compound attributes, or at least one compound attribute.

An elementary attribute space is an attribute space that does not contain any compound attributes, at least ideally.

A state is an actual assignment of a value to each attribute of the attribute space.

An initial state is the current state of the environment as observed or modelled by the system.

The term goal refers to a definition of the state or of the states that the system should achieve. The goal is usually incomplete, e.g. only for some attributes a desired value is given. The goal can be inferred from a description given by a user. The description uses the term target state or target states interchangeably with the term goal.

An action denotes a rule that describes under which condition(s) a state changes or transfers into a next state (changed state).

An effect is a change of a value of an attribute, which an action causes.

A plan is an ordered sequence of actions that can transfer an initial state to a state that satisfies the goal or the at least one target state. A planner or planning module may find the plan by searching, e.g., trying out actions iteratively. A planning module is a structural element, e.g. combining software with at least one data processing hardware device, which performs planning by applying a planning algorithm.

The domain includes the set of actions and the attribute space the system uses to represent and to solve a certain planning problem.

A device is a specific structural object or an instrumentality designed for a particular purpose. The device may be used on an object and will change some attributes of the object. Thus, applying the device to an object has an effect on the object.

The term means refers to a physical process a device exposes an object to, and exposing an object to a means finally results in the effect on the object.

FIG. 1 is a schematic view of the general planning loop of the method according to an embodiment. The discussion of the embodiment uses the specific example of an assistance system 1 in a kitchen environment and performing specific tasks such as preparing food. A specific example includes the assistance system 1 controlling a kitchen robot as an autonomous device 2 to prepare toasted bread in the kitchen environment.

The discussion of embodiments of the method for operating an assistance system 1 refers to the robotic assistance system 1 in the kitchen environment for illustration purposes in order to discuss particular aspects in a possible implementation. The discussed aspects may be transferred to robotic assistance systems 1 in different task environments, e.g. a manufacturing environment, a logistic environment or a vehicle workshop. The assistance system 1 may operate in a real world environment as the discussed kitchen environment, or assist a user in achieving goals in a virtual environment, e.g. a training environment or even a game environment for recreational purposes.

The process depicted in FIG. 1 starts with step S1, which includes obtaining a task from a user. The obtained task may have the form of an initial request or goal formulated by the user that may contain compound attributes, e.g. the goal "I want a toasted bread" provided verbally by the user and including the compound attribute "toasted bread".

The obtained goal defines at least one target state, which the user requests the assistance system 1 to achieve in the environment.

In step S2, the assistance system 1 interprets the obtained goal using information from a knowledge base available to the assistance system 1. The assistance system 1 interprets the obtained goal that 'toasted' is a result of the action "use a toaster", because the user might previously have taught the assistance system 1 accordingly.

Step S2 includes obtaining initial state information defining an initial state of at least one of an autonomous device 2 or an assisted person, and of at least one object involved in achieving the at least one target state. The initial state may include a current position of a kitchen robot, a location of bread in the kitchen as an example for the object, and a current location and operational status of the toaster as an example for the device.

The knowledge base may have the form of a database stored locally, e.g. in a memory of the autonomous device 2. Alternatively or additionally, the database may be stored on at least one server arranged locally in the kitchen, or at a remote location and connected to the assistance system 1 via a network N.

In step S2, the assistance system 1 defines a planning problem based on the obtained task information, the initial state information and further based on attribute information related to the at least one object stored in the database. In particular, the database may provide information on actions and on the initial state(s) for defining the planning problem as an initial planning problem in step S2.

The assistance system 1 provides the generated initial planning problem to a planning module of the assistance system 1 for solving the initial planning problem in step S3. The assistance system 1 will find a plan that represents a solution in the compound attribute space only under specific, and therefore narrow conditions, e.g., when the preferred device to prepare toasted bread—the toaster—is present in the kitchen and available for use.

The planning module selects an action, or, more probably, a sequence of actions to solve the generated initial planning problem formulated in the compound attribute space in step S3. The planning module may arrange the selected actions in a particular sequence in order to transit from an initial state possibly via intermediate states to the target state/one of the defined target states. The planning module outputs in step S3 a plan to solve the initial planning problem.

In step S4 following after step S3, the assistance system 1 determines whether the planned action or sequence of actions achieves the target state.

In case the assistance system 1 determining in step S4 that a plan for addressing the initial planning problem can be found, in particular the plan is executable and determined to achieve the target state, the assistance system 1 may proceed to executing the plan, in particular the action or sequence of actions included in the plan in step S7.

In case of determining that the selected action or sequence of actions according to the plan provided by the planning module does not achieve (one of) the target state(s), or even the planning module failed in finding a plan to solve the obtained initial planning problem, the method proceeds from step S4 to step S5.

In step S5, the assistance system 1 proceeds in the planning loop with decomposing some or all compound attributes of the initial problem into elementary attributes using stored knowledge from the knowledge base as discussed with reference to FIG. 3 in more detail.

In particular, the database provides attribute information (decomposition information) for enabling the assistance system 1 to decompose at least one compound attribute into a set of decomposed attributes, preferably into a set of elementary attributes.

Step S5 includes decomposing the generated planning problem, here the initial planning problem based on attribute information stored in the database to generate a decomposed planning problem, and providing the decomposed planning problem to the planning module. The decomposed planning problem may be formulated in the elementary attribute space in case the decomposed planning problem includes no compound attributes at all.

Alternatively, the decomposed planning problem including still at least one compound attribute is worded in the in the elementary attribute space, however, at least one compound attribute of the planning problem input to the decomposing step S4 had been replaced by a set of elementary attributes.

Step S4 may generate a revised planning problem (new planning problem) with a larger solution space, which the assistance system 1 provides to the planning module in order to find a solution for the revised planning problem in the decomposed attribute space or elementary attribute space respectively. Preferably, the planning module is the same planning module as used in step S3 for solving the initial planning problem in the compound attribute space.

The assistance system 1 may implement the planning module using a standard planner generally known in the art of planning systems.

In case the assistance system 1 determines in step S6 following to step S5 that the decomposition in step S5 failed in decomposing the planning problem input to the decomposing step S5, the processing terminates (NO). In this case, the assistance system 1 failed in devising a workable solution to the planning problem and the obtained goal.

In case the assistance system 1 determines in step S6 that the decomposing step S5 succeeded in decomposing the planning problem in the compound attribute space as input to the decomposing step S5, the processing provides the decomposed planning problem in the elementary attribute space or decomposed compound attribute space to the planning module. The processing therefore resumes with step S3, which has the planning module attempting to find a plan solving the decomposed planning problem, instead of solving the initial planning problem.

The assistance system may repeat the processing loop of steps S3-S4-S5-S6 in an iterative planning process until determining that the predetermined criterion is met.

The iterative planning process may terminate when the planner finds a plan, which proves executable in steps S4 and S7, or no further decomposition of the planning problem input to the decomposing step S5 is possible.

In case step S4 determines the initial planning problem or the decomposed planning problem being solvable by the plan devised by the planning module in step S3, the assistance system 1 executes the plan in step S7. Step S7 may in particular include generating and outputting a control signal based on the plan, and thus based on the solved decomposed planning problem to a human-machine interface of the assistance system 1 for assisting the user in achieving the at least one target state or the goal provided in step S1 to the assistance system 1. The assistance system 1 may guide the user (assisted person) via perceivable signal output by the human-machine interface in achieving the at least one target state.

Alternatively or additionally, step S7 may include generating and outputting a control signal based on the solved decomposed planning problem to the autonomous device 2, e.g. the kitchen robot for achieving the target state or goal obtained in step S1 by the assistance system 1. The autonomous device 2 may autonomously perform the actions based on the control signal in order to achieve the target state.

Alternatively or additionally, step S7 may include generating and outputting the control signal based on the solved decomposed planning problem to the autonomous device 2 for achieving the target state by the autonomous device 2 in collaboration with the user under guidance of the assistance system 1.

The general planning loop discussed with reference to FIG. 1 includes generating an initial planning problem from a given goal and based on available knowledge about the current state of the task environment, the actions and the devices with which the assistance system 1 already has experience. Usually, the initial planning problem will use a high level of abstraction, which offers the advantage of an efficient planning process and plan execution process. Thus, the initial planning problem will most naturally locate in the more abstract compound attribute space. If the assistance system 1 fails in finding a plan, the assistance system 1 attempts decomposing the original planning problem representation into a more elementary planning problem representation (decomposed planning problem), and then proceeds with trying to solve the decomposed planning problem as a new planning problem.

The decomposing process summarized in step S7 may be an iterative decomposing process, e.g., decomposing the planning problem may start with the initial planning problem, and include several levels of decomposing the planning problem that sequentially build upon each other.

Figure 2:
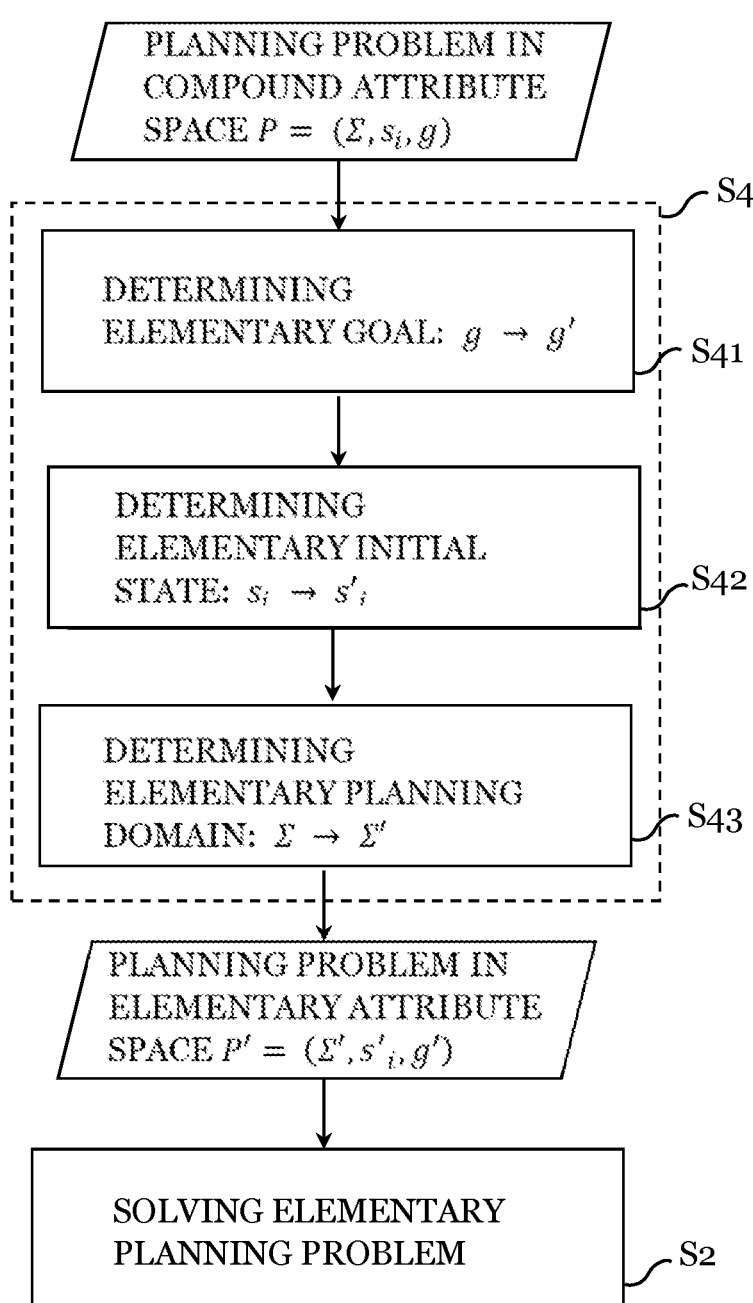
FIG. 2 provides a flowchart illustrating selected steps of decomposing the planning problem according to an embodiment.

FIG. 2 provides a flowchart illustrating selected steps of decomposing the planning problem according to an embodiment.

The assistance system 1 performs the processing step S4 on a planning problem in the compound attribute space $P=(\Sigma, s_i, g)$ that comprises attributes including a set of goals or target states $g$, a set of initial states $s_i$, and a compound planning domain $\Sigma$. At least one, or a plurality of the attributes included in the planning problem are compound attributes. Thus, the planning problem is formulated in the compound attribute space $P=(\Sigma, s_i, g)$.

The decomposing step S4 may include successfully performing at least one of steps S41, S42 and S43 shown in FIG. 2 in order to succeed in decomposing the input planning problem P and to generate and output the decomposed planning problem P'. In the particular example of FIG. 2, the decomposed planning problem P' is the elementary planning problem P'=($\Sigma$', s'$_i$, g'), which does not include compound attributes $\Sigma$, s$_i$, g, but instead exclusively includes elementary attributes comprising a set of elementary goals (elementary target states) g', a set of elementary initial states s'$_i$, and an elementary planning domain $\Sigma$'.

Step S4 of decomposing the planning problem in the compound attribute space P based on the attribute information stored in the database for generating the decomposed planning problem P' may include at least one of the sub-steps S41, S42, and S43.

Steps S41, 42, and S43 may be performed each in a single cycle of the decomposing step S4. Alternatively, steps S41, 42, and S43 or a combination of these steps may be performed individually in one cycle of the decomposing step S4 each during an iterative approach of implementing the planning loop in an embodiment.

Step S41 includes determining the elementary target states g' and replacing compound target states g with corresponding elementary target states g'.

Step S42 includes determining the elementary initial states s'$_i$ and replacing compound initial states s$_i$ with the corresponding elementary initial states s'$_i$i.

Step S43 includes determining the elementary planning domain $\Sigma$' and replacing the compound planning domain $\Sigma$ with the corresponding elementary planning domain $\Sigma$'$_i$.

FIG. 2 may be interpreted as showing a general processing flow for inferring and solving the planning problem in the elementary attribute space P' starting from the initial planning problem in the compound attribute space P. The assistance system 1 infers for solving the planning problem in the elementary attribute space P', the elementary goal g', the elementary initial state s'$_i$, and the elementary planning domain $\Sigma$'. The elementary planning domain essentially includes the elementary actions.

Inferring the elementary goal g', the elementary initial state s'$_i$, and the elementary planning domain $\Sigma$' may include a mapping from a definition of the goal g, the initial state s$_i$, and the planning domain $\Sigma$ in the compound attribute space P to the corresponding goal g', the initial state s$_i$', and the planning domain $\Sigma$' in the elementary attribute space P'.

In particular, the assistance system 1 may perform the mapping from a definition of the goal g, the initial state s$_i$, and the planning domain $\Sigma$ in the compound attribute space P to the corresponding goal g', the initial state s$_i$', and the planning domain $\Sigma$' in the elementary attribute space P' based on attribute information (decomposition information) acquired from the database. The decomposition information may include a correspondence table (lookup table) or a plurality of correspondence tables. Data structures relating the decomposition information and used for mapping in the decomposing step S5 are topic for a discussion in detail with reference to FIGS. 3, 4, 5, and 6 in more detail.

The generated decomposed planning problem in the elementary attribute space P'=($\Sigma$', s'$_i$, g') forms a new input to the planning module for solving now the decomposed planning problem in the elementary attribute space P', in particular, finding a plan providing executable solution of the obtained task.

Figure 3:
FIG. 3 provides an exemplary data structure of attribute information for mapping compound attributes in a compound attribute space to a set of elementary attributes in the elementary attribute space.

FIG. 3 provides an exemplary data structure of attribute information for mapping compound attributes in the compound attribute space P to a set of elementary attributes in the elementary attribute space P'. FIG. 3 illustrate the compound attribute space P and the elementary attribute space P' for the specific application area of a kitchen environment.

The mapping of compound attributes to sets of elementary attributes in the decomposing process of step S5 may include mapping of at least one compound attribute to a corresponding set of elementary attributes. The mapping may include a mapping of each compound attribute included in the planning problem representation that is input to the decomposing step S5 to a set of elementary attributes.

FIG. 3 illustrates a group of compound attributes in the compound attribute space Pin the upper portion of FIG. 3. The compound attributes include "raw bread" and "toasted bread".

The lower portion of FIG. 3 arranges a group of elementary attributes in the elementary attribute space P'. The elementary attributes shown in FIG. 3 include instances "cool" and "hot" for the elementary attribute "temperature". Further elementary attributes include instances "hard" and "soft" for the elementary attribute "hardness". Yet further elementary attributes include instances "white" and "brown" for the elementary attribute "color". Yet further elementary attributes include instances "wet" and "dry" for the elementary attribute "wetness". Yet further elementary attributes include instances "light" and "dark" for the elementary attribute "lightness".

FIG. 3 illustrates the attribute information in form of correspondences shown as arrows. The compound attribute "toasted bread" is mapped to the set of elementary attributes ["hot", "hard", "brown", "dark"]. Using the attribute information, the decomposing process of step S5 may replace the compound feature "toasted bread" with the set of elementary attributes for the object "bread" including the elementary attributes "hot", "hard", "brown", and "dark" based on the attribute information included in FIG. 3.

A mapping performed based on the attribute information illustrated in FIG. 3 may be used to infer the at least one target state g' in the elementary attribute space P' in step S41 of FIG. 2 and the at least one initial state s'$_i$ in the elementary attribute space P' in step S42 of FIG. 2.

Decomposing according to step S5 may include the assistance system 1 internally referring to the correspondence table storing the attribute information of FIG. 3 and performing the mapping of compound attributes to the sets of elementary attributes based on the stored correspondence table. The initial planning problem generated based on the obtained task defining that a user desires a toasted bread, includes as part of the target state the compound attribute "toasted bread" in the compound attribute space P. In the decomposing step S5, the assistance system 1 may refer to the attribute information to determine a set of elementary attributes corresponding to the compound attribute of "toasted bread". According to the attribute information shown in in FIG. 3, a corresponding set of elementary attributes is ["hot", "hard", "brown", "dark"]. The assistance system 1 can now use the set of elementary attributes ["hot", "hard", "brown", "dark"] instead in the decomposed planning problem in the elementary attribute space P' and try to solve this new, decomposed planning problem.

Furthermore, in the decomposing step S5, the assistance system 1 may refer to the attribute information to determine the set of elementary attributes corresponding to the compound attribute of "raw bread". According to the attribute information shown in FIG. 3, a corresponding set of elementary attributes is ["cool", "soft", "white", "light"]. The assistance system 1 can use the set of elementary attributes

["cool", "soft", "white", "light"] as the new, decomposed initial state $s_i'$ in the decomposed planning problem.

Figure 4:
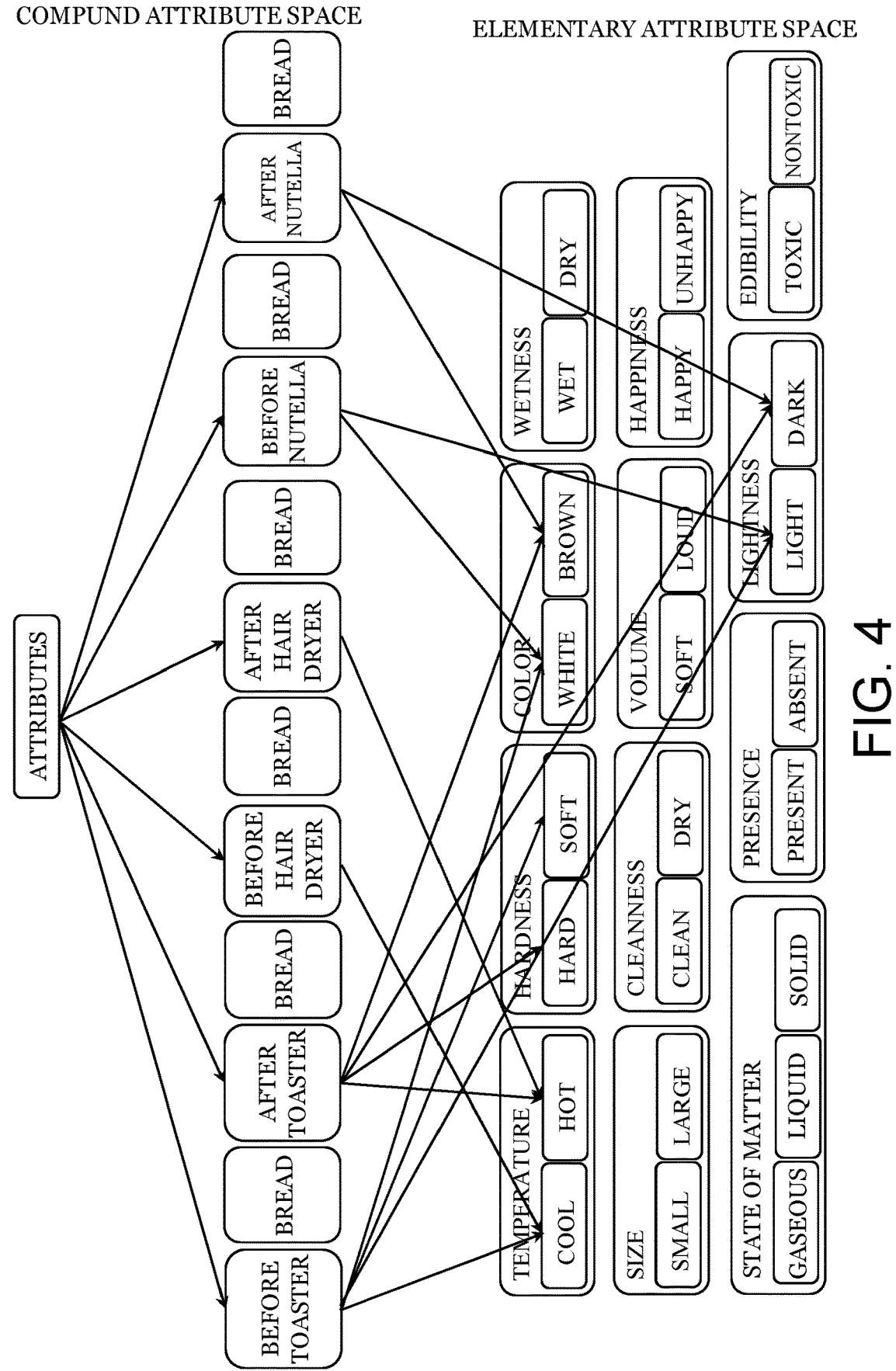
FIG. 4 provides an exemplary data structure of attribute information representing states of objects for mapping compound attributes in a compound attribute space to a set of elementary attributes in the attribute space.

FIG. 4 displays a second exemplary data structure of attribute information representing states of objects for mapping compound attributes in the compound attribute space P to sets of elementary attributes in the elementary attribute space P'.

In particular, FIG. 4 displays attributes defining states of objects before using a device and after using a device in the compound attribute space P and the corresponding representation by sets of elementary attributes in the elementary attribute space P'. The attributes shown in FIG. 4 define the states before and after using the device "toaster", "hair dryer", "Nutella" with the object "bread".

As a first example for the compound attribute "before toaster" in the compound attribute space P, a corresponding set of elementary attributes in the elementary attribute space P' includes the elementary attributes ["cool", "soft", "white", "light"].

As a second example for the compound attribute "after toaster" in the compound attribute space P, a corresponding set of elementary attributes in the elementary attribute space P' includes the elementary attributes ["hot", "hard", "brown", "dark"].

As a third example for the compound attribute "before hair dryer" in the compound attribute space P, a corresponding set of elementary attributes in the elementary attribute space P' includes the elementary attribute ["cool"].

As a fourth example for the compound attribute "before hair dryer" in the compound attribute space P, a corresponding set of elementary attributes in the elementary attribute space P' includes the elementary attribute ["hot"].

As a fifth example for the compound attribute "before Nutella" in the compound attribute space P, a corresponding set of elementary attributes in the elementary attribute space P' includes the elementary attributes ["white", "light"].

As a sixth example for the compound attribute "after Nutella" in the compound attribute space P, a corresponding set of elementary attributes in the elementary attribute space P' includes the elementary attributes ["brown", "dark"].

The assistance system 1 can now infer for each device "toaster", "hair dryer", and "Nutella", which effect it might have on the object "bread" under certain conditions and use this as a new set of actions for planning in the decomposed planning domain $\Sigma'$ in the elementary attribute space P'.

FIGS. 3 and 4 illustrate the attribute information in the decomposing step S5 for generating the new, decomposed planning problem in the elementary attribute space P'. A standard planner implementing the planning module uses now, in the second approach, the decomposed planning problem in the elementary attribute space P' that is fully defined in order to find a solution.

Figure 5:
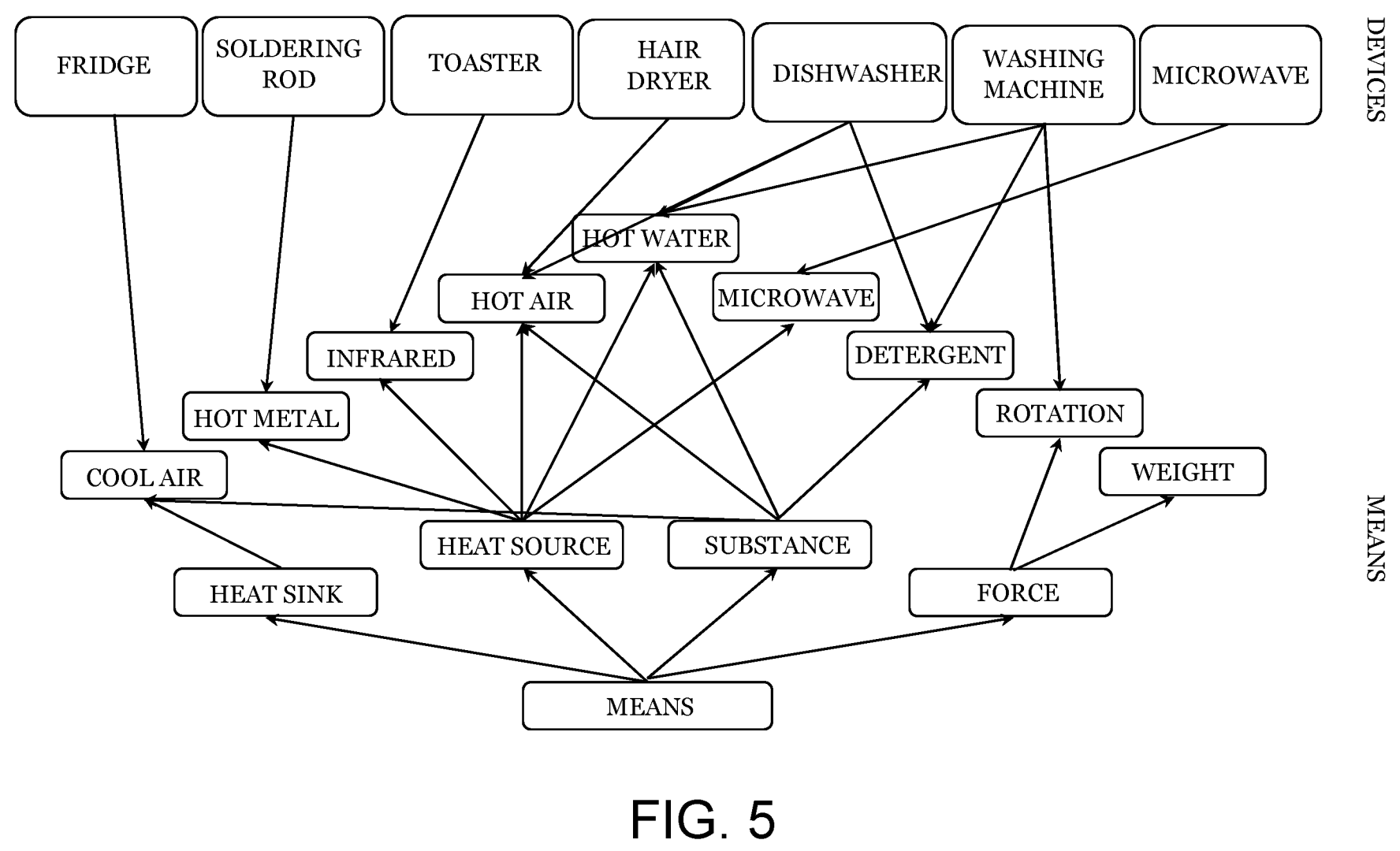

FIG. 5 provides further examples for data structures of attribute information illustrating a correspondence between objects, means for achieving effects and effects on objects.

The devices shown in FIG. 5 include examples usually found in a kitchen environment and in task environments distinct to the kitchen environment. The depicted devices include "fridge", "soldering rod", "toaster", "hair dryer", dishwasher", "washing machine", and "microwave".

The attribute information illustrated in FIG. 5 includes means. The attribute information may define specific means that might have an effect on objects, which are exposed to a specific means. Devices do not effect objects directly but instead expose the object to specific means that might have an effect on the object. For example, the device "dishwasher" exposes an object to means including "detergent", "hot water", and "hot air".

The means of FIG. 5 include "heat sink", "heat source", "substance(s)" and "force". The listed means may include further differentiations as shown in FIG. 5. For example, the means "heat source" allows differentiation between "hot metal", "infrared", "hot air", "hot water", and "microwave". The means "substance" sums up "cool air", "hot air", "hot water", and "detergent". The means "force" covers "rotation" and "weight". The means "substance" includes "cool air", "hot air", "hot water", and "detergent". The means "force" differentiates between "rotation" and "weight". The means "heat sink" may correspond to the means of "hot air".

Having the device "toaster" in the original planning problem defined in the compound attribute space included, may accordingly result in the decomposed planning problem in the elementary attribute space including the means "infrared" and "heat source". Providing the decomposed planning problem to the planning module may increases the space for seeking for a solution to the planning problem, as in addition to the device "toaster" further devices exposing an object to the means "heat source" and "infrared" may be considered.

The assistance system 1 may be configured to observe, to determine, or to measure an effect a device exposes objects to only for few objects, which are common in the task environment and in combination with the device. A direct mapping shown in in FIG. 4 can result in a still incomplete decomposition.

Still for achieving innovative planning results by planning on decomposed planning problems in the elementary attribute space P', a refined mapping is advantageous or even required. Based on the decomposition information illustrated in FIG. 5, the assistance system 1 may predict yet unknown mappings from compound attributes in the compound attribute space P to decomposed attributes in the decomposed attribute space P' by exploiting knowledge about a similarity to already known, or already observed mappings stored in the database in terms of the devices and objects.

Figure 6:
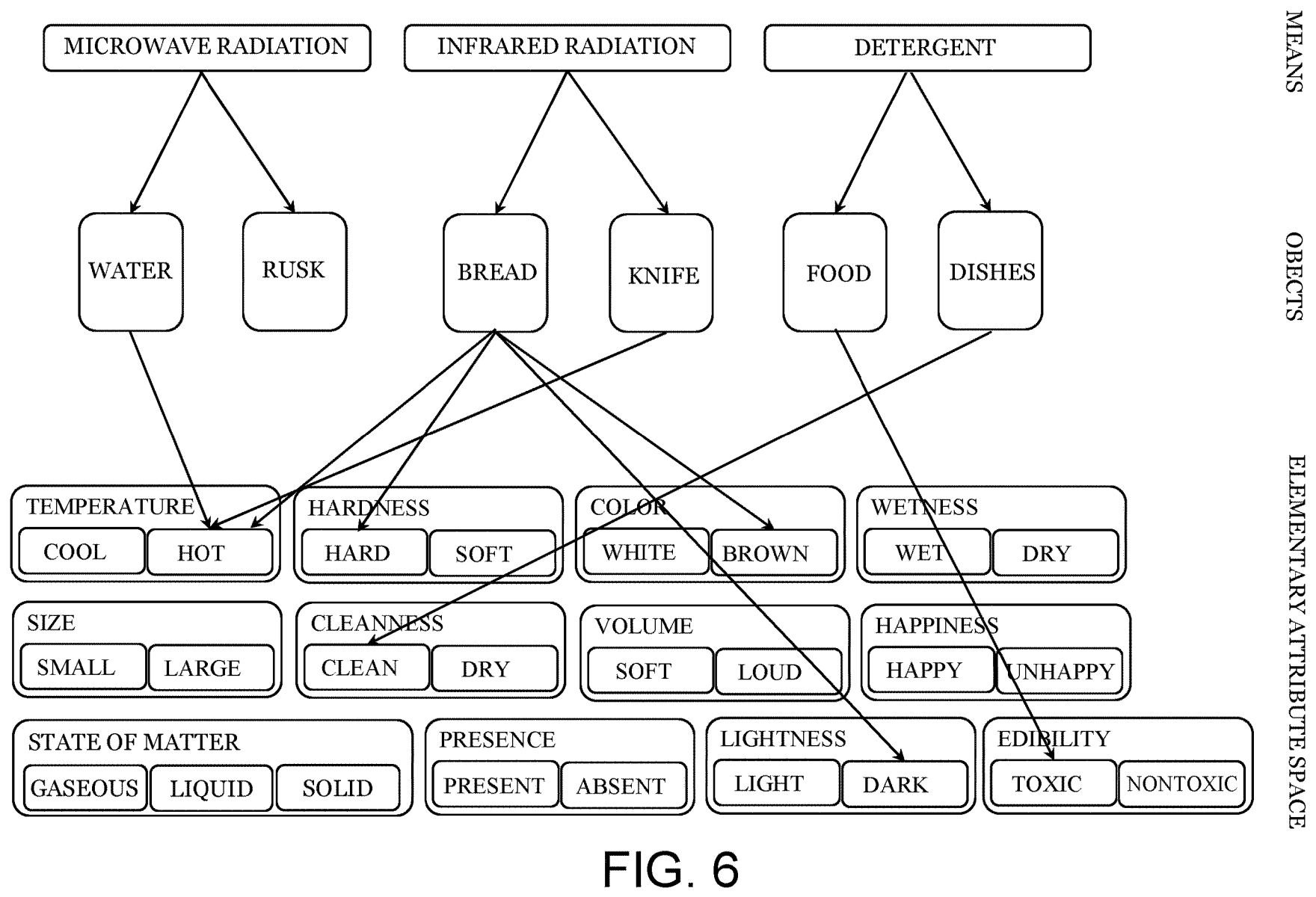

FIG. 6 provides an exemplary data structure of attribute information illustrating a correspondence between means for achieving effects, objects, and representation of means to elementary attributes in the elementary attribute space P'.

The upper portion of FIG. 6 shows different means that include "microwave radiation", 'infrared radiation", and "detergent" The different means respectively have different effects on specific objects in the elementary attribute space P'. In the example of FIG. 6, exposing the object "knife" to "infrared radiation" has the effect that the object "knife" has afterwards the elementary attribute "hot" as temperature in the elementary attribute space P'. Exposing the object "bread" to the means "infrared radiation" has a more complex effect on the object "bread". After exposure to the means "infrared radiation" the object "bread" has afterwards the set of elementary attributes that includes ["hot", "hard", "dark" and "brown"] in the elementary attribute space P'.

Correspondingly, the assistance system 1 may obtain from the database which effect in the elementary attribute space P' is achieved on an object when it is exposed to a means, as shown in FIG. 6. Based on the obtained means, the assistance system 1 can predict that a yet unobserved device included in the task environment might have a similar effect on an object as an observed device has on the same object if both devices expose the object to the same means. For example, the decomposing in step S5 may exploit that exposing the object "bread" to a toaster has a same means "infrared radiation" as a yet unobserved device "baking oven".

The knowledge concerning a correspondence from means to effects illustrated in FIG. 6 and reflected in the attribute information may involve generalized object categories like "food" for "bread" and respective instances of "food", thereby achieving in the attribute information that an effect generalizes from the particular instance, e.g. "bread", to all objects in the category, e.g. "food", even if it was never observed for most of the other specific instances in the category "food". Thus, the decomposed planning problem in the elementary attribute space P' including the category "food" and other instances of the category "food" may increase the space for searching potential solutions in the planning process performed by the planning module further. Thus, the decomposed planning problem in the elementary attribute space P' supports finding a plan for a planning problem defined in the elementary attribute space P' that had no solution when defined in the compound attribute space P.

Embodiments of the method are particularly useful in planning applications for robotic assistance systems, as is discussed with reference to a robotic kitchen assistance system.

Generally, the robotic assistance systems may represent the properties of objects and devices in the task environment more precisely and consistently together with the processes, which the objects and devices undergo. Planning based on the decomposed planning problem in the elementary attribute space P' may yield more innovative and thus convincing planning solutions than previously available when regarding the planning problem in the compound attribute space P although using basically the same planning module.

The planning-based robotic assistance system determines whether it is necessary to transfer an abstract planning problem into a more physical representation of the objects in the task environment and of the processes and actions, which the objects undergo. The method uses a specifically more physical attribute space, called the decomposed attribute space P' or elementary attribute space P'. The method decomposes non-elementary attributes, in particular compound attributes into a set of elementary attributes. The assistance system 1 has access to attribute information as decomposition information in a database for performing the decomposing step S5. The method may even include a process to infer further missing elementary attributes thereby further extending the elementary attribute space P' to include further elementary attributes, which add yet unobserved effects and states to the attribute information stored in the database. By building and maintaining an elementary attribute representation of the task environment, the method plans with an extended elementary attribute space P' including objects, devices, states and actions and thus may find different and often more convincing and efficient solutions to the planning problem currently not available for planning problems defined in the compound attribute space P.

Figure 7:
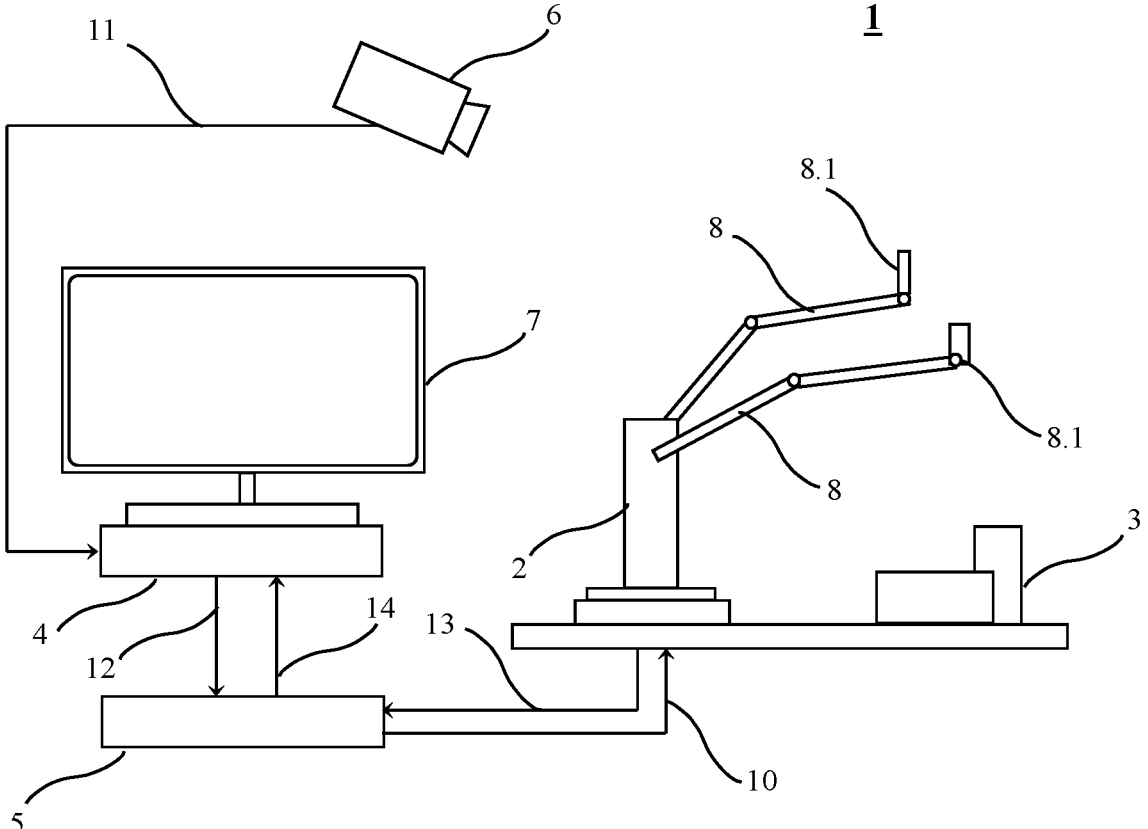
FIG. 7 illustrates a specific application scenario of the method for operating an assistance system including an autonomous device in a kitchen environment.

FIG. 7 illustrates a specific application scenario of the method for operating an assistance system 1 including an autonomous device 2 in a kitchen environment.

The autonomous device 2, or agent, is an artifact whose configuration of sensors, actuators, and integrated control system provides a significant level of flexible, independent, and autonomous skill. The term autonomous denotes the extent to which autonomous device 2 is able to sense the environment, capable to plan a behavior based on the sensed environment, and to act by performing sequences of actions or skills based on the sensed environment with the intent of reaching a goal without external control. A user may provide the goal to the autonomous device 2 via a human-machine interface.

Alternatively, the autonomous device 2 may create the goal itself.

The robotic assistance system 1 of FIG. 7 comprises the autonomous device 2, shown as a stationary bi-manual robot, with two effectors 8, an object-tracking device 6, e.g. a camera-based or marker-based object-tracking device 6. The robotic assistance system 1 comprises data processing equipment, e.g. at least one computer 4, which is configured to run a planning algorithm and a motion generating algorithm for planning actions and sequences of actions for performance by the autonomous device 2. In particular, a program implementing a planning process implementing the planning module in order to devise a plan to address a task by controlling at least one effector trajectory of the effectors 8 may run on the computer 4.

The computer 4 may include at least one processor, at least one memory, for example comprising non-volatile and volatile memories for storing program instructions, and program data generated during execution of the method.

The robotic assistance system 1 acquires a task description for the predefined task, for example, via a human-machine interface for obtaining instructions from a user to the robotic assistance system 1. For example, an obtained task description (task) may instruct the robotic assistance system 1 to prepare toasted bread in a household application including a kitchen scenario.

The object-tracking device 6 determines a current location of the object 3 in the task environment. The object-tracking device 6 generates a sensor signal 11 and provides the sensor signal 11 to the computer 4. The sensor signal 11 may enable the robotic assistance system 1 to determine states of the autonomous device 2 and of objects and devices 3 in the observed task environment. The observed states and the sensor signal also enable the robotic assistance system 1 to monitor a task progress while performing a sequence of skills.

The computer 4 runs in the planning module a planning algorithm that enables the assistance system 1 to search for plan to solve a planning problem provided to the planning module.

The assistance system 1 may include a robot control unit 5 of the robotic system 1 for controlling actuators of the effectors 8 of the autonomous device 2 using actuator control signals 10 generated based on the control signal 12 provided by the computer 4 of the assistance system 1.

The autonomous device 2 may generate a status signal 13 and output the status signal 13 to the robot control unit 5. The robot control unit 5 may provide the information contained in the status signal 13 along with further status information on the autonomous device 2 to the computer 4 in a status signal 14.

The computer 4 may include the human-machine interface comprising input/output means, for example, output means such as a monitor 7 for displaying image information to a user, and input means such as keyboard and a mouse device, or microphone for receiving input from the user. The computer 4 may in particular run software implementing the human-machine user interface. The human-machine interface may include for example a graphic user interface GUI for interacting with the user.

The computer 4 may include the human-machine interface configured to display the image information to a user that guides the user in achieving the target state. The human-machine interface may also include a virtual reality device configured to visualize a task environment existing in the real world to the user.

Additionally or alternatively, the human-machine interface may include an augmented reality device configured to present information to a user that guides the user in achieving the target state as an overlay image to the task environment existing in the real world to the user. In this embodiment, the human machine interface may run, e.g., on a tablet computer equipped with a camera. A display may present the information for guiding the user as a semi-transparent overlay image to an image of the task environment acquired by the camera of the tablet computer.

Alternatively, the human-machine interface may include the virtual reality device configured to visualize a generated virtual environment to the user. E.g., the human-machine interface enables to user to obtain guidance for performing tasks in a computer game environment.

The structure of the robotic assistance system 1 as shown FIG. 7 is one example.

It is noted, that some or all structural elements of the robotic assistance system, e.g. the computer 4, the robot control unit 5, and the object-tracking device 6 may be integrated into the autonomous device 2.

The autonomous device 2 is not limited to a stationary device, but may also be implemented as a mobile autonomous device moving around the task environment. The autonomous device 2 may implement an assistive household robot. For helping in the kitchen, the autonomous device 2 needs to know about objects, e.g. food, and devices, e.g. kitchen tools, how they can be used, which effects the kitchen tools have when applied to a specific object, for example. For this purpose, a hierarchy of all the entities present in the kitchen as the current task environment can be taught beforehand or extracted from other knowledge sources like, e.g. a publicly available database (knowledge base) accessed via a computer network not explicitly shown in FIG. 7, or may be taught beforehand as well as being extracted from the other knowledge sources.

The autonomous device 2 may have pre-stored knowledge concerning some tasks, e.g., preparing a sandwich, that includes skills comprising cutting bread, toasting bread, cutting lettuce, skinning and slicing a tomato, for example. The proposed method for operating the assistance system 1 that sues decomposed program representations in an elementary attribute space P' increases the usability of the assistance system 1 in novel situations in the task environment. For example, when tasked to prepare toasted bread, the robotic assistance system 1 may overcome the problem that the only available toaster is defect, and employ the oven instead for solving the decomposed planning problem in the elementary attribute space P'.

All steps which are performed by the various entities described in the present disclosure as well as the functionalities described to be performed by the various entities are intended to mean that the respective entity is adapted to or configured to perform the respective steps and functionalities. In the claims as well as in the description the word "comprising" does not exclude the presence of other elements or steps.

In the specification and the claims, the expression "at least one of A and B" may replace the expression "A and/or B" and vice versa due to being used with the same meaning.

The indefinite article "a" or "an" does not exclude a plurality. A single element or other unit may fulfill the functions of several entities or items recited in the claims. The mere fact that different dependent claims recite certain measures and features of the converter circuit does not exclude that a combination of these measures and features cannot combined in an advantageous implementation.

The invention claimed is:

1. Method for operating an assistance system based on an attribute space, comprising:
    obtaining task information defining at least one target state to be achieved by the assistance system;
    obtaining initial state information defining an initial state of at least one of an autonomous device or a user, and of at least one object involved in achieving the target state or one of the target states;
    defining a planning problem based on the obtained task information, the initial state information and further based on attribute information related to the at least one object stored in a database;
    selecting, by a planning module, an action or a sequence of actions to solve the defined planning problem; and
    generating and outputting a control signal to at least one of a human-machine interface (HMI) for assisting the user in achieving the target state or one of the target states or to the autonomous device for achieving the respective target state; and
    the method further comprises:
    determining, by the assistance system, whether the selected action or sequence of actions achieves the target state, and, in response to determining that the selected action or sequence of actions does not achieve the target state,
    decomposing, by the assistance system, the defined planning problem based on the attribute information stored in the database to generate a decomposed planning problem, and providing the decomposed planning problem to the planning module of the assistance system;
    solving, by the planning module, the decomposed planning problem; and
    generating and outputting the control signal based on the solved decomposed planning problem to at least one of the human-machine interface for assisting the user in achieving the target state or to the autonomous device for achieving the target state.

2. Method for operating an assistance system according to claim 1, wherein
    the stored attribute information comprises compound attributes and elementary attributes defining at least a state of the at least one object, an initial state of the planning problem, and an effect a device has on the at least one object under at least one predetermined condition.

3. Method for operating an assistance system according to claim 1, wherein
    decomposing the defined planning problem includes mapping at least one compound attribute included in the generated planning problem to a set of elementary attributes based on the stored attribute information.

4. Method for operating an assistance system according to claim 3, wherein
    the stored attribute information comprises a correspondence table that stores compound attributes associated with sets of elementary attributes for performing the mapping.

5. Method for operating an assistance system according to claim 3, wherein
    the mapping includes at least one of mapping the at least one target state g, the initial state s, and the planning domain $\Sigma$ in a compound attribute space to a respective at least one elementary target state g', an elementary initial state si', and an elementary planning domain $\Sigma'$ in an elementary attribute space.

6. Method for operating an assistance system according to claim 3, comprising predicting a new mapping of the compound attribute to the set of elementary attributes based on a similarity of the new mapping to a predetermined mapping in terms of a similarity of the at least one object with another object.

7. Method for operating an assistance system according to claim 6, wherein predicting a new mapping from the compound attribute to the set of elementary attributes based on the similarity includes predicting that the at least one object exerts a similar effect as the other object in case the at least one object and the other object expose an object to a same means.

8. Method for operating an assistance system according to claim 6, wherein predicting a new mapping from the compound attribute to the set of elementary attributes based on the similarity includes generalizing a prediction that a predetermined object exerts an effect to an object category and predicting that another predetermined object of the same object category exposes an object to the same means and provides the same effect as the predetermined object.

9. Method for operating an assistance system according to claim 6, wherein predicting a new mapping from the compound attribute to the set of elementary attribute is based on at least one of predetermined relation information provided during a design phase of the assistance system, relation information generated by an expert, and relation information generated online in an interaction process with the user of the assistance system.

10. Method for operating an assistance system according to claim 1, comprising decomposing the defined planning problem based on the stored attribute information iteratively to generate the decomposed planning problem until a predetermined criterion is met.

11. Method for operating an assistance system according to claim 10, comprising determining that the predetermined criterion is met in case the selected action or sequence of actions solving the decomposed planning problem achieve the target state or one of the target states.

12. Method for operating an assistance system according to claim 10, comprising determining that the predetermined criterion is met in case no further mapping of a compound attribute to a corresponding set of elementary attributes based on the stored attribute information is available.

13. Method for operating an assistance system according to claim 1, wherein the method runs online during a planning process for achieving the target state or one of the target states.

14. Method for operating an assistance system according to claim 1, wherein the assistance system is included in a robotic assistance system including the autonomous device.

15. Method for operating an assistance system according to claim 1, wherein the assistance system is embedded in a controller of the autonomous device, or the assistance system is implemented in software running on a remote server linked via a network to the autonomous device.

16. Method for operating an assistance system according to claim 1, wherein the assistance system guides the user via the human-machine interface in achieving the at least one target state, and the human-machine interface includes a virtual reality device configured to visualize a task environment existing in the real world or a generated virtual environment to the user, or the human-machine interface includes an augmented reality device configured to present information for guiding the user as an overlay to the task environment existing in the real world and as perceived by the user.

17. A non-transitory computer readable medium having a computer readable program embodied therein, wherein the computer readable program, when executed on a computing device, causes the computing device to perform a method for operating an assistance system based on an attribute space, the method comprising:

obtaining task information defining at least one target state to be achieved by the assistance system;

obtaining initial state information defining an initial state of at least one of an autonomous device or a user, and of at least one object involved in achieving the at least one target state;

defining a planning problem based on the obtained task information, the initial state information and further based on attribute information related to the at least one object stored in a database;

selecting, by a planning module, an action or a sequence of actions to solve the defined planning problem; and generating and outputting a control signal to at least one of a human-machine interface (HMI) for assisting the user in achieving the target state or one of the target states or to the autonomous device for achieving the respective target state; and the method further comprises:

determining, by the assistance system, whether the selected action or sequence of actions achieves the target state, and, in response to determining that the selected action or sequence of actions does not achieve the target state, by the assistance system, decomposing the generated planning problem based on the attribute information stored in the database to generate a decomposed planning problem, and providing the decomposed planning problem to the planning module of the assistance system;

solving, by the planning module, the decomposed planning problem; and generating and outputting the control signal based on the solved decomposed planning problem to at least one of the human-machine interface for assisting the user in achieving the target state or to the autonomous device for achieving the target state.

* * * * *